James C. French's Improvement in Vault Lights

No. 117,063          Patented Jul 18 1871

Witnesses
Geo. G. Hunt
R. R. French

Inventor
James C. French

UNITED STATES PATENT OFFICE.

JAMES C. FRENCH, OF CHICAGO, ILLINOIS.

IMPROVEMENT IN VAULT-LIGHTS.

Specification forming part of Letters Patent No. 117,063, dated July 18, 1871.

*To all whom it may concern:*

Be it known that I, JAMES C. FRENCH, of Chicago, in the county of Cook and State of Illinois, have invented certain Improvements in Vault-Lights, of which the following is a specification:

The nature and object of my invention relate to a new and improved method of manufacturing metallic frames or plates in which are fixed or set glass plates, or disks, or lenses for illuminating vaults, apartments beneath sidewalks, and other similar purposes. The nature of the invention consists, furthermore, in an improved method of setting the aforesaid glass disks or lenses in the before-mentioned metallic frames. The object had in view is principally to prevent the sweating or condensation of moisture, which, in the ordinary solid vault-light frame, is a source of great annoyance in cold weather.

Figure 1:
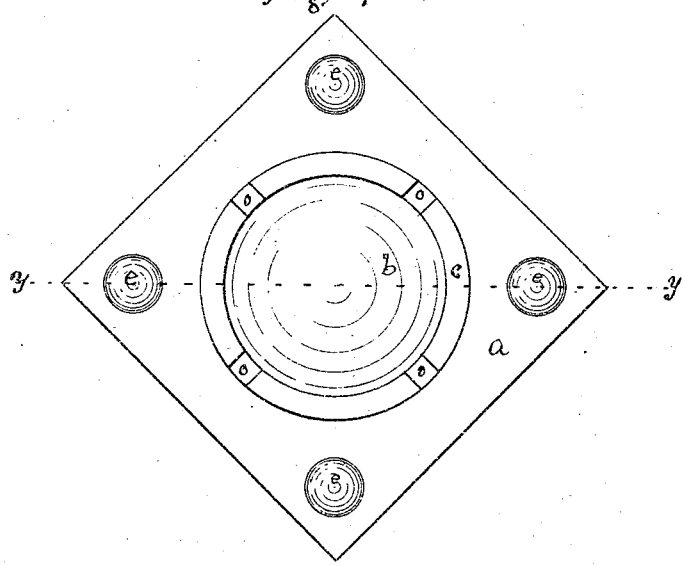
Figure 2:
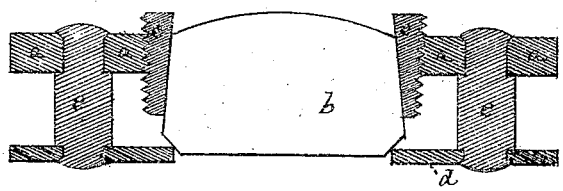

Figure 1 is a top view of a portion of a metallic frame with a glass disk or lens set in position. Fig. 2 is a vertical section of the same taken in the line $y\,y$, Fig. 1.

$a$ is a metallic plate, which is of wrought-iron, but may be made of any metallic substance, having one or more apertures, in which are fixed the glass disks $b$. The apertures in the frame $a$ are threaded with a female screw, in which are placed the metal rings $c$, said ring or rings having on the exterior a male-screw thread, which coincides with the screw-thread in the plate $a$. These rings have a series of notches or slots, $o$, in the upper edge thereof, into which may be inserted a suitable wrench, by means of which they can be firmly screwed to their proper position. The rings $c$ are made slightly conical, being somewhat smaller at the lower than at the upper edge, so as by this means they wedge as they are screwed to position, and a water-tight joint is thereby secured. The rings are also made with internal-sloping sides, the opening therein being smallest at the top, the glass disks $b$ being made with sloping edges corresponding to the slope in the rings. $d$ is a lower plate, which is firmly riveted or bolted to the plate $a$ by means of the bolts or rivets $e$, these bolts having shouldered tenons at the ends, by means of which the plates are kept a little distance apart. The plate $d$ has apertures coinciding with the apertures in the frame $a$. The apertures in the plate $d$ are made a little smaller than the transverse diameter of the disks in the largest part, so that the said disks may not be forced down into or through the plate $d$. After the plates $a$ and $d$ are prepared for setting the glasses a disk is inserted in one of the apertures. The ring $c$, being well coated with paint, is screwed into the aperture, and, being wedge-form, it presses with tremendous force on not only the plate $a$, but also grasps exceedingly tight the glass disk $b$, thus making a tight and durable joint. The space between the plates serves admirably as a non-conductor of cold, thus obviating in a great degree the condensation of moisture on the lower surface thereof. The rings $c$ are made to project a short distance above the extreme upper surfaces of the glass disks; but the slots $o$ are made deep enough so that water from the top of the glass disks may pass off. The projection of the rings above the surface of the disks serves not only for a protection of the glass, but forms a rough surface, so that danger from slipping when walking thereon is avoided.

Having thus described my invention, what I claim as new, and desire to secure by Letters Patent, is—

The combination of the metallic plates $a$ and $d$ with the glass disk or lens $b$ and screw-packing $c$, when made substantially in the manner and for the purposes hereinbefore specified.

JAMES C. FRENCH.

Witnesses:
   GEO. G. HUNT,
   R. R. FRENCH.